United States Patent Office 3,131,062
Patented Apr. 28, 1964

3,131,062
TRIPHENYL LEUCOCYANIDE SENSITIVE COMPOSITIONS AND ELEMENTS
Meyer S. Agruss, Chicago, Ill., assignor to Miehle-Goss-Dexter, Incorporated, Chicago, Ill., a corporation of Delaware
No Drawing. Filed Jan. 27, 1960, Ser. No. 4,875
15 Claims. (Cl. 96—85)

This invention relates to the art of printing and is particularly concerned with the preparation of new and useful photosensitive compositions which may be coated on paper or other suitable surfaces, in the form of essentially colorless or relatively lightly colored bodies, and which are rendered colored or deeply colored, by exposure, through a desired transparency or the like, to electromagnetic radiation lower than 4000 angstrom units, particularly ultraviolet light or other such activating rays, for instance, X-rays.

It has long been known that solutions of aminotriarylacetonitriles or, in other words, leucocyanides of triphenylmethane dyes, generally in the form of solutions thereof, may be coated on paper or other materials in conjunction with an activator and exposed to ultraviolet light or shorter wave lengths, through a transparency, whereupon said aminotriarylacetonitriles are converted into colored bodies or dyes. Suitable activators known for such purpose are, for instance, alcohols, phenols, carboxylic acids such as tartaric acid, citric acid and benzoic acid, as well as other carboxylic acids and esters thereof, veratrole, resorcinol dimethyl ether, ethylene glycol ethers, phosphoric acid esters of monohydroxy compounds, aromatic carbinols, and numbers of other compounds. These approaches, and others, are disclosed in various patents among which may be mentioned U.S. Patents Nos. 2,441,-561; 2,528,496; 2,676,887; 2,829,052; and 2,844,465. Thus, as disclosed in said patents, if an organic solvent solution, for example, a toluene solution, of a leucocyanide of a triphenylmethane dye, for instance, pararosaniline leucocyanide, malachite green leucocyanide, tetrachloro malachite green leucocyanide, crystal violet leucocyanide, and various other leucocyanides of triphenylmethane dyes such as are shown in the aforementioned patents, is coated onto paper, such solution is not affected by ultraviolet light. However, when an activator, for example, a higher molecular weight alcohol or higher molecular weight amine, or other activators, such as the activators disclosed in the aforementioned patents, is present, the leucocyanides of the triphenylmethane dyes become extremely sensitive to ultraviolet light and the leucocyanide compounds are changed quite quickly to their colored dye compounds.

In practical use, the compositions of the prior art, such as those which have been discussed above, have numbers of serious objections. For instance, when paper is coated with a solution of a leucocyanide of a triphenylmethane dye together with activators of the type described above, and said coated papers are exposed to ultraviolet light through a transparency, the colored dye images which result tend to fade out and become substantially colorless in a relatively short period of time, sometimes of the order of 24 hours, and this not infrequently occurs in the dark as well as under ambient light conditions. By "ambient" light conditions is meant normal indoor lighting or daylight. Attempts have been made to meet this problem, generally, for example, by the addition of acids, particularly non-volatile organic acids such as stearic acid, and, in certain special instances, by the selection of specific types of leucocyanides. Although the addition of such carboxylic acids as stearic acid tends to prevent the disappearance of the image while stored in the dark, under ambient light storage conditions the background of the image continues to get darker with the passage of time.

Other difficulties have also been encountered in connection with attempting to evolve commercially practicable compositions. Such difficulties have centered around such matters as inadequate maintenance of the sharpness of reproductions, adverse effects resulting from reactions of the leucocyanide or the dye with sizes inherently present in the papers which are coated with the leucocyanide compositions, and the fact that the activation of the dye in the presence of ultraviolet or other actinic light requires a much longer period of time through an ordinary film negative than when no transparency is used.

The present invention is based upon various discoveries which bring about marked improvements in compositions of the character heretofore discussed so that commercially practicable compositions result.

It has been found, among other things, that background darkening due to ambient conditions acting on the dyes in exposed coated papers can be effectively reduced or at least largely prevented by applying, to the side of the paper or other material to which the leucocyanide compound is applied, transparent organic film-forming materials having a minimum thickness of 0.0025 inch. The transparent organic film-forming material which can be utilized for this purpose may be selected from among the many synthetic plastics and resins which, per se, are known in the art as, for example, polystyrene, polyesters, polymethacrylates, ethyl cellulose, methyl cellulose, polyvinyl chloride, polyvinyl acetate, regenerated cellulose, nitrocellulose, ethylene glycol terephthalate ("Mylar"), cellulose acetate and chlorinated rubber-like materials. Such film-forming materials, however, when used on conventional sized papers, generally tend to some extent to react with the usual paper sizes with some adverse resulting effects. Among other effects, the formed dyes not infrequently react with such paper sizes.

While, therefore, background darkening due to ambient conditions can be reduced or largely prevented in the manner described above, relatively thick coatings, sometimes involving a plurality of separate coatings to obtain the required thickness, are required and certain disadvantages obtain so that the foregoing practice, though useful, is not preferred.

It has been found, however, that cellulose acetate butyrates are especially effective coating materials, when applied to the side of paper or other materials to which the leucocyanide compound is applied, since they do not react adversely with the usual paper sizes. They may, thus, be utilized as background darkening inhibiting means as such if applied in a thickness of at least 0.0025 inch, or they can be used as barrier film coatings of various thicknesses upon which coatings of the same or other transparent organic film-forming materials such as those mentioned above can be laid down. While various cellulose acetate butyrates can be utilized in the practice of the present invention, those which are especially desirably employed contain a butyryl content of from 17 to 48 weight percent and an acetyl content of 29.5 to 6 per weight percent. Those in which the butyryl content is on the higher side and in which the acetyl content is on the lower side are particularly preferred. For best results, the cellulose acetate butyrates, and the same is true with respect to the other transparent organic film-forming materials, should be either unplasticized or very low in their content of plasticizing agents.

It has also been found, in accordance with the present invention, that the darkening of the background of the exposed coated papers, after exposure to ultraviolet light through a transparency, is markedly reduced, under ambient conidtions of light, if there is incorporated into the coating, or if there is embodied in a top coat, certain chemical compounds. These compounds, which are described in detail below, are used in conjunction with the leucocyanides and activators to inhibit darkening of the background of the exposed sensitized coated surfaces. If desired, known inhibitors or retardants such as stearic acid or cinnamic acid or other non-volatile carboxylic acids may be used together therewith.

The said chemical compounds, which possess this inhibiting action when utilized in accordance with the present invention, comprise mononuclear aryl esters of hydroxy benzoic acid and certain substituted benzophenones.

Illustrative examples of the mononuclear aryl esters of hydroxy benzoic acid are phenyl meta-hydroxybenzoate phenyl para-hydroxybenzoate, tolyl meta-hydroxybenzoate, para-cresyl meta-hydroxybenzoate, n-butyl phenyl hydroxybenzoate, tertiary butyl phenyl hydroxybenzoate; and particularly aromatic, especially mononuclear aryl, esters of salicyclic acid such as phenyl salicylate, benzyl salicylate, menthyl salicylate, tolyl salicylate, ortho-isopropyl salicylate, ortho-cresyl salicylate, and 4'-tertiary butyl phenyl salicylate. Various of said aryl esters of hydroxy benzoic acid can be represented by the formula

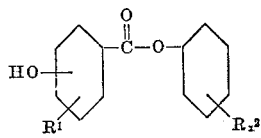

where $R^1$ and $R^2$ are hydrogen, or a hydrocarbon, hydrocarbonoxy, or halogen radical, and $x$ is an integer preferably 1 and not more than 3. Particularly preferred are those compounds where the OH radical is ortho to the carboxyl group, as in salicylic acid, and where each of $R^1$ and $R^2$ (to the extent that they are hydrocarbon or hydrocarbonxy) do not contain more than 4 carbon atoms.

Illustrative examples of the substituted benzophenones which are highly effective in use pursuant to the present invention are 2,4-dihydroxy benzophenone; 2-hydroxy-4-methoxy benzophenone; 2,2'-4,4'-tetrahydroxy benzophenone; 2,2'-dihydroxy-4,4'-dimethoxy benzophenone; 2,4-dibenzoyl resorcinol; 5-chloro-2-hydroxy benzophenone; and 2,2'-dihydroxy-4-methoxy benzophenone. The substituted benzophenones particularly utilized in accordance with the present invention are characterized by the presence of an hydroxy group in either the 2 position and better still in both the 2 and 2' positions in relation to the linking

group of the benzophenone. Various of said substituted benzophenones can be represented by the formula

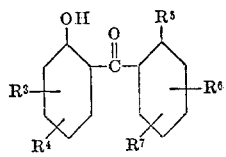

where $R^3$, $R^4$, $R^5$, $R^6$ and $R^7$ are hydrogen, or hydroxy, hydrocarbon, hydrocarbonoxy, or halogen radicals. While, as stated, $R^5$ may be any of the foregoing, it is particularly advantageous if $R^5$ is hydroxyl since the resulting compounds are especially effective for use pursuant to the present invention. Among typical hydrocarbon, hydrocarbonoxy and halogen radicals which are represented by $R^3$, $R^4$, $R^5$, $R^6$ and $R^7$ are aliphatic radicals such as methyl, ethyl, propyl, isopropyl, butyl, iso-butyl, amyl, isoamyl, hexyl; aromatic and aromatic-aliphatic radicals such as phenyl, methyl phenyl, ethyl phenyl, isopropyl phenyl, tolyl, naphthyl, isopropyl naphthyl; hydrocarbonoxy radicals such as methoxy, ethoxy, propoxy, isopropoxy and butoxy; and halogen radicals such as chlorine, bromine and iodine.

The aforesaid mononuclear aryl esters of hydroxy benzoic acid and substituted benzophenones should advantageously be colorless and odorless or substantially so for most effective use.

These inhibiting compounds, as indicated above, need not be used in the leucocyanide-activator composition coating but are also effective when embodied in a cover or top coating which transmits the sensitizing ultraviolet rays, said inhibitors functioning, as stated, to prevent background darkening by ambient conditions. Furthermore, the coated papers, when stored in the dark for relatively long periods of time, of the order of at least two months, and then exposed to ultraviolet light through a transparency, are essentially as sensitive as when freshly prepared.

It has, additionally, been discovered that certain titanium esters, when utilized in conjunction with the leucocyanides of the triphenylmethane dyes, act as activators for said leucocyanides and, in addition, serve to reduce or prevent background darkening. The said titanium esters are, in general, those derived from hydroxy alkylene, and especially from tetrahydroxyalkylene, derivatives of alkylene polyamines, particularly ethylene diamine.

At least most of the alkylene diamine derivatives, whose titanium esters are employed, may be represented by the formula

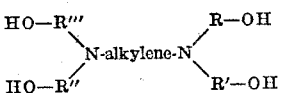

where alkylene is ethylene, propylene or butylene, and R, R', R'' and R''' are each lower alkylene radicals as, for instance, ethylene, propylene, isopropylene, butylene and isobutylene. Corresponding derivatives are prepared from alkylene triamines and tetra-amines as, for instance, diethylene-triamine and triethylene tetra-amine. Illustrative examples of such compounds which, in the form of their titanium esters, can be utilized in the practice of the present invention are $N_1N_1N^1N^1$-tetrakis (hydroxyethyl) ethylene diamine; $N_1N_1N^1N^1$-tetrakis (2-hydroxypropyl) ethylene diamine; and $N_1N_1N^1N^1$-tetrakis (2-hydroxybutyl) ethylene diamine. Of particular utility is $N_1N_1N^1N^1$-tetrakis (2-hydroxypropyl) ethylene diamine (sold in commerce under the trademark "Quadrol") which, as stated, is used in the form of its titanium esters, there being preferably from 3 to 4 molecules of "Quadrol" for each molecule of titanium in said titanium esters. The titanium esters of such ethylene diamine derivatives as N-(2-hydroxypropyl) ethylene diamine can also be utilized but not so satisfactorily as those derived from "Quadrol." The aforesaid titanium esters are per se known in the art.

As stated, in coated papers, prepared from light sensitive compositions comprising leucocyanides of triphenylmethane dyes and the aforesaid titanium esters as activators, exposed to ultraviolet light through a transparency, the darkening of backgrounds under ambient conditions is very substantially reduced, and dark reactions in the coated papers is essentially eliminated.

The leucocyanides of the triphenylmethane dyes which are utilized in accordance with the present invention can be selected, for instance, from those which are known to the art and disclosed in numerous patents and publications of which the foregoing patents are typical. These include, in addition to those previously mentioned, and those disclosed in said foregoing patents, leucocyanide of rosaniline; leucocyanide of new fuchsine; 4,4'-bis-dimethylamino-2''-chloro-triphenylacetonitrile and like leucocyanide compounds represented by the formula

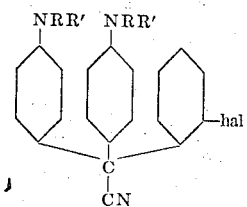

where R and R' are lower alkyl radicals and hal is halogen such as chlorine or bromine.

Various organic solvents can be utilized for the leucocyanides of the triphenylmethane dyes. Low boiling or volatile alcohols, ketones, ethers, esters, and hydrocarbons are available. Typical examples of organic solvents are methyl alcohol, ethyl alcohol, isopropyl alcohol, acetone, dioxane, methylethyl ketone, ethyl ether, isopropyl ether, ethyl acetate, nitromethane, nitroethane, benzene, toluene, dimethylformamide and tetrahydrofurane.

The proportions of the ingredients are variable within reasonable limits.

The leucocyanides of the triphenylmethane dyes will generally be utilized in proportions of the order of 0.5% to 3%, preferably from about 1% to 1.5%, by weight of the solution in which they are incorporated and which is utilized for effecting coating of the paper or equivalent surface.

The cellulose acetate butyrate, where utilized, will, in general, constitute from about 5% to 10% by weight of the coating solution. It should not be present in such concentrations as to produce solutions of such high viscosity as to render difficult the coating operation. Similar considerations are applicable where the cellulose acetate butyrate is used, for instance, simply as a top coating over the leucocyanide-activator coated paper or the like or as a barrier coating directly on the paper over which the leucocyanide coating is applied. The solutions will advantageously have viscosities in the range of 30 to 6000 centipoises at 25 degrees C.

The titanium esters of $N_1N_1N^1N^1$-tetrakis (2-hydroxypropyl) ethylene diamine and like titanium esters will generally be utilized in proportions of the order of 2 to 25%, preferably about 5 to 12%, by weight of the solution in which the same are incorporated.

The background darkening inhibiting compounds in the form of the above-described mononuclear esters of hydroxy benzoic acid and substituted benzophenones, when incorporated into the coating solution containing the leucocyanide and activator, are employed in quite small proportions, usually in the range of about 0.5 to about 2%, by weight, preferably about 1%, of such coating solution. When embodied in a separate cover coating or top coating, the proportions utilized may be of the same general order.

The following examples are illustrative of compositions falling within the scope of the invention. They are, of course, not to be construed as in any way limitative of the invention since numerous changes may be made, with respect to selection of leucocyanides, activators, coatings, ranges of proportions, and the like, without departing from the novel principles and teachings presented herein. All parts listed are by weight percent.

*Example 1*

| | |
|---|---|
| Leucocyanide of crystal violet | 1 |
| Titanium ester of $N_1N_1N^1N^1$-tetrakis (2-hydroxypropyl) ethylene diamine | 25 |
| 25% solution of cellulose acetate butyrate in 50–50 mixture of toluene and ethyl acetate | 25 |
| Dioxane | 49 |

*Example 2*

| | |
|---|---|
| Leucocyanide of malachite green | 1 |
| Titanium ester of $N_1N_1N^1N^1$-tetrakis (2-hydroxypropyl) ethylene diamine | 15 |
| 25% solution of cellulose acetate butyrate in 50–50 mixture of toluene and ethyl acetate | 30 |
| Cinnamic acid | 2 |
| Dioxane | 52 |

*Example 3*

| | |
|---|---|
| Leucocyanide of pararosaniline | 1 |
| Tetraethylene glycol dimethyl ether | 12 |
| Cinnamic acid | 2 |
| 2,4-dibenzoyl resorcinol | 1 |
| 25% solution of cellulose acetate butyrate in 50–50 mixture of toluene and ethyl acetate | 30 |
| Dioxane | 54 |

*Example 4*

| | |
|---|---|
| Leucocyanide of crystal violet | 1 |
| Resorcinol dimethyl ether | 30 |
| 2,2'-4,4'-tetrahydroxy benzophenone | 1 |
| 25% solution of cellulose acetate butyrate in 50–50 mixture of toluene and ethyl acetate | 30 |
| Dioxane | 38 |

*Example 5*

| | |
|---|---|
| Leucocyanide of malachite green | 1 |
| Titanium ester of $N_1N_1N^1N^1$-tetrakis (2-hydroxypropyl) ethylenediamine | 5 |
| 2,2'-dihydroxy-4,4'-dimethoxy benzophenone | 1 |
| 25% solution of cellulose acetate butyrate in 50–50 mixture of toluene and ethyl acetate | 30 |
| Dioxane | 63 |

Each of the foregoing compositions is coated onto paper on which advantageously a thin barrier coating comprising a toluene-ethyl acetate solution of cellulose acetate butyrate is first deposited and then dried. After the coatings are dried, they are exposed to a source of ultraviolet light through a cellulose acetate butyrate, cellulose acetate or other transparency. The resulting colored papers show sharp reproductions which are stable over long periods of time to conditions of darkness as well as ambient light.

As indicated above, transparent cellulose acetate butyrates represent especially desirable organic film-forming materials, whether used as barrier coatings; as coatings in solution in which the leucocyanides and activators, with or without the background darkening inhibitor compounds, are dispersed or dissolved; or as top coatings with or without background darkening inhibitor compounds dispersed or dissolved therein. However, in the broader aspects of the invention, other transparent organic film-forming materials can be utilized either as barrier coatings or as intermediate or top coatings in which the leucocyanides, activators and background darkening inhibitors, as the case may be, can be embodied.

As previously indicated, the mononuclear aryl esters of hydroxy benzoic acid and substituted benzophenones can be incorporated into the coating composition containing the leucocyanide of the triphenylmethane dye and the activator or, alternatively, they may be embodied in whole or in part in one or more top or cover coatings comprising, for instance, a solution of cellulose acetate butyrate in a suitable organic solvent or organic solvent mixture such as toluene and ethyl acetate. Coated papers or other materials can also be utilized in which the top or cover coating is a thin transparent organic film as, for instance, cellulose acetate butyrate without any substituted benzophenone or aromatic ester of salicyclic acid.

Instead of utilizing a single coating of a given thickness containing the leucocyanides of triphenylmethane dyes, it is usually more desirable to employ a plurality of coatings, either two or more, each of thinner character so as to provide a total thickness corresponding to what would otherwise be in the form of a single coating.

The leucocyanides of the triphenylmethane dyes, in the presence of an activator, are, as stated above, sensitive when subjected to ultraviolet light and various of them are also sensitive to other electromagnetic radiation shorter than 4000 angstrom units. Moreover, within the ultraviolet range or the aforesaid range of electromagnetic radiation, the various leucocyanides vary in the sensitivity with different wave lengths. In general, the range of wave lengths in which sensitivity mainly occurs is approximately 2000 to 4000 angstrom units, with strongest sensitivity usually lying in the range of 2500 to 3400 angstrom units. Various suitable sources of the aforesaid rays or radiation are available in the art including, by way of example, quartz mercury lamps, ultraviolet cored carbon arcs, and high-flash lamps.

Transparencies of various types can be employed as, for instance, those of cellulose acetate and cellulose acetate butyrate, advantageously of a thickness not appreciably exceeding 0.0025 inch. When ultraviolet rays are passed through an ordinary film negative, the time required to cause formation of the dye from its leucocyanide is much longer than when no transparency is used. Hence, in order to obtain rapid activation of the leucocyanide, the use of transparencies of the character indicated above is especially advantageous.

While, at least for most purposes, papers will constitute the surfaces on which the photosensitive coatings are deposited, it will be understood that, in the broader aspects of the invention, various other materials can be used such as metals, glass, textile fabrics, and sheet stock or films of synthetic plastics such as cellulose acetate, cellophane, cellulose acetate butyrate, etc.

The photosensitive compositions of the present invention may have incorporated therein various supplemental agents such as have heretofore been utilized in known photosensitive compositions so long as they do not adversely affect the desired properties and characteristics of said compositions.

In the broader aspects of the present invention, the mononuclear aryl esters of hydroxy benzoic acid and substituted benzophenones need not be utilized in conjunction with the titanium esters such as those of $N_1N_1N^1N^1$-tetrakis (2-hydroxypropyl) ethylene diamine, nor with cellulose acetate butyrate as the organic coating or film-forming material. The said mononuclear aryl esters of hydroxy benzoic acid and substituted benzophenones bring about substantial improvements in leucocyanide-activator compositions of the types heretofore known in the art as disclosed, for instance, in the previously identified patents. However, the realization of the full advantages of the present invention is achieved when the mononuclear aryl esters of hydroxy benzoic acid and substituted benzophenones are utilized in conjunction with cellulose acetate butyrate and with the aforesaid titanium esters.

The invention is of value in the arts of color and multicolor printing, photography and photoduplication, microfilm enlargement, and actinometry.

What is claimed and desired to be secured by Letters Patent is:

1. A photosensitive composition, sensitive to ultraviolet light, comprising a leucocyanide of a triphenylmethane dye and, as an activator therefor, a titanium ester of an alkylene polyamine in which at least one hydrogen directly attached to nitrogen of said polyamine is replaced by an hydroxyalkyl radical.

2. A photosensitive composition, sensitive to ultraviolet light, comprising an organic solvent solution containing cellulose acetate butyrate, a leucocyanide of a triphenylmethane dye, and, as an activator for said leucocyanide, a titanium ester of a $N_1N_1N^1N^1$-tetrakis (hydroxyalkyl) alkylene polyamine.

3. A photosensitive composition, sensitive to ultraviolet light, comprising a leucocyanide of a triphenylmethane dye and, as an activator therefor, a titanium ester of $N_1N_1N^1N^1$-tetrakis (2-hydroxypropyl) ethylene diamine.

4. A photosensitive composition, sensitive to ultraviolet light, comprising an organic solvent solution containing cellulose acetate butyrate, a leucocyanide of a triphenylmethane dye, and, as an activator for said leucocyanide, a titanium ester of $N_1N_1N^1N^1$-tetrakis (2-hydroxypropyl) ethylene diamine.

5. A photosensitive composition, sensitive to ultraviolet light, comprising a leucocyanide of a triphenylmethane dye, an activator which renders said leucocyanide sensitive to ultraviolet light, and a mononuclear aryl ester of hydroxy benzoic acid to inhibit background darkening under conditions of ambient light.

6. A photosensitive composition, sensitive to ultraviolet light, comprising a leucocyanide of a triphenylmethane dye an activator which renders said leucocyanide sensitive to ultraviolet light, and a compound effective to inhibit background darkening under conditions of ambient light, said compound being a substituted benzophenone satisfying the formula

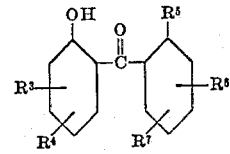

where $R^3$, $R^4$, $R^5$, $R^6$ and $R^7$ are selected from the group consisting of hydrogen, and hydroxy, hydrocarbon, hydrocarbonoxy, and halogen radicals.

7. A photosensitive composition, sensitive to ultraviolet light, comprising a leucocyanide of a triphenylmethane dye, an activator which renders said leucocyanide sensitive to ultraviolet light, and a compound effective to inhibit background darkening under conditions of ambient light, said compound being a substituted benzophenone selected from the group consisting of 2,4-dihydroxy benzophenone; 2-hydroxy-4-methoxy benzophenone; 2,2'-4,4'-tetrahydroxy benzophenone; 2,2'-dihydroxy-4,4'-dimethoxy benzophenone; 2,2'-dihydroxy-4-methoxy benzophenone; and 5-chloro-2-hydroxy benzophenone.

8. A photosensitive composition, sensitive to ultraviolet light, comprising a leucocyanide of a triphenylmethane dye, an activator which renders said leucocyanide sensitive to ultraviolet light, and a compound effective to inhibit background darkening under conditions of ambient light, said compound being a mononuclear aryl ester of hydroxy benzoic acid satisfying the formula

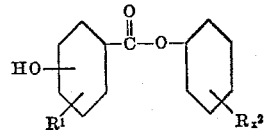

where $R^1$ and $R^2$ are members selected from the group consisting of hydrogen, and hydrocarbon, hydrocarbonoxy, and halogen radicals, and $x$ is an integer not more than 3.

9. A photosensitive composition, sensitive to ultraviolet light, comprising a leucocyanide of a triphenylmethane dye, an activator therefor in the form of a titanium ester of an alkylene polyamine in which at least one hydrogen directly attached to nitrogen of said polyamine is replaced by an hydroxyalkyl radical, and a mononuclear aryl ester of hydroxy benzoic acid to inhibit background darkening under conditions of ambient light.

10. A photosensitive composition, sensitive to ultraviolet light, comprising an organic solvent solution containing cellulose acetate butyrate, a leucocyanide of a triphenylmethane dye, an activator for said dye in the form of a titanium ester of $N_1N_1N^1N^1$-tetrakis (2-hydroxypropyl) ethylene diamine, and a compound effective to inhibit background darkening under conditions of ambient light, said compound being a substituted benzophenone selected from the group consisting of 2,4-dihydroxy benzophenone; 2-hydroxy - 4 - methoxy benzophenone; 2, 2'-4,4'-tetrahydroxy benzophenone; 2,2'-dihydroxy - 4,4' - dimethoxy benzophenone; 2,2'-dihydroxy-4-methoxy benzophenone; and 5-chloro-2-hydroxy benzophenone.

11. Photosensitive sheet material comprising sheet stock carrying a cellulose acetate butyrate coating containing a leucocyanide of a triphenylmethane dye, an activator which renders said leucocyanide sensitive to ultraviolet light, and a mononuclear aryl ester of hydroxy benzoic acid to inhibit background darkening under conditions of ambient light.

12. Photosensitive sheet material comprising sheet stock carrying a cellulose acetate butyrate coating containing a leucocyanide of a triphenylmethane dye and an activator which renders said leucocyanide sensitive to ultraviolet light, said activator being a titanium ester of a $N_1N_1N^1N^1$-tetrakis (hydroxyalkyl) alkylene polyamine.

13. Photosensitive sheet material comprising sheet stock carrying a coating containing a leucocyanide of a triphenylmethane dye, an activator which renders said leucocyanide sensitive to ultraviolet light, and a mononuclear aryl ester of hydroxy benzoic acid to inhibit background darkening under conditions of ambient light.

14. Photosensitive sheet material comprising paper sheet stock carrying a transparent organic film-forming coating containing a leucocyanide of a triphenylmethane dye and an activator which renders said leucocyanide sensitive to ultraviolet light, said activator being a titanium ester of a $N_1N_1N^1N^1$-tetrakis (hydroxyalkyl) alkylene polyamine.

15. Photosensitive paper sheet material comprising paper sheet stock carrying on its surface a leucocyanide of a triphenylmethane dye, an activator which renders said leucocyanide sensitive to ultraviolet light, and a compound effective to inhibit background darkening under conditions of ambient light, said compound being a substituted benzophenone satisfying the formula

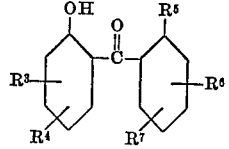

where $R^3$, $R^4$, $R^5$, $R^6$ and $R^7$ are selected from the group consisting of hydrogen, and hydroxy, hydrocarbon, hydrocarbonoxy, and halogen radicals.

References Cited in the file of this patent

UNITED STATES PATENTS

| | | |
|---|---|---|
| 2,676,887 | Chalkley | Apr. 27, 1954 |
| 2,719,086 | Sawdey et al. | Sept. 27, 1955 |
| 2,877,166 | Chalkley | Mar. 10, 1959 |
| 2,921,407 | Wagner et al. | Jan. 19, 1960 |

FOREIGN PATENTS

| | | |
|---|---|---|
| 431,072 | Great Britain | July 1, 1935 |

OTHER REFERENCES

Handbook of Plastics, Simonds et al., D. Van Nostrand Co., Inc., Princeton, N.J., 2nd ed., 1949, page 72. (Copy in Div. 60.)